United States Patent
Woodall et al.

(10) Patent No.: US 11,937,053 B1
(45) Date of Patent: *Mar. 19, 2024

(54) METHODS AND SYSTEMS FOR SOUND FILE CREATION

(71) Applicant: COLUMBIA INSURANCE COMPANY, Omaha, NE (US)

(72) Inventors: Joseph M. Woodall, Ringgold, GA (US); Julie B. Brumbelow, Dalton, GA (US); Barrett R. Morton, Cartersville, GA (US); David Wayland Dong, Los Angeles, CA (US); John Loverde, Cypress, CA (US)

(73) Assignee: Columbia Insurance Company, Omaha, NE (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/952,926

(22) Filed: Nov. 19, 2020

Related U.S. Application Data (63) Continuation of application No. 16/447,387, filed on Jun. 20, 2019, now Pat. No. 10,880,663.

(60) Provisional application No. 62/687,644, filed on Jun. 20, 2018.

(51) Int. Cl.
*H04R 29/00* (2006.01)
*G06F 16/68* (2019.01)
*G06T 17/05* (2011.01)

(52) U.S. Cl.
CPC ............ *H04R 29/00* (2013.01); *G06F 16/68* (2019.01); *G06T 17/05* (2013.01)

(58) Field of Classification Search
CPC .......... H04R 29/00; G06F 16/68; G06T 17/05
See application file for complete search history.

(56) References Cited

U.S. PATENT DOCUMENTS

| | | | |
|---|---|---|---|
| 6,212,838 | B1 | 4/2001 | Eda |
| 7,194,094 | B2 | 3/2007 | Horrall et al. |
| 7,918,313 | B2 | 4/2011 | Gross et al. |
| 8,590,670 | B1 | 11/2013 | Grube et al. |

(Continued)

FOREIGN PATENT DOCUMENTS

| | | |
|---|---|---|
| CN | 101208653 A | 6/2008 |
| WO | 2007001613 A2 | 1/2007 |
| WO | WO-2019/050965 A1 | 3/2019 |

OTHER PUBLICATIONS

U.S. Appl. No. 62/554,468, filed Sep. 5, 2017, Joseph M. Woodall.

(Continued)

*Primary Examiner* — Daniel R Sellers
(74) *Attorney, Agent, or Firm* — Ballard Spahr LLP (57) ABSTRACT

Provided are methods and systems for performing a series of acoustic tests in a variety of testing environments comprising several types of construction assemblies. Prior to performing each acoustic test, a plurality of audio parameters corresponding to a given construction assembly can be used to configure an electronic device that captures audio produced by the acoustic test with a microphone and stores the captured audio as a computer sound file. Further, an acoustic testing device can be used during the acoustic test to gather data indicative of a result of the acoustic test. The result can then be mapped, along with information related to the given construction assembly, to the computer sound file.

20 Claims, 6 Drawing Sheets

(56) References Cited

U.S. PATENT DOCUMENTS

| | | | |
|---|---|---|---|
| 8,640,824 B2 | 2/2014 | Freedman et al. | |
| 8,819,554 B2 | 8/2014 | Basso et al. | |
| 9,224,379 B2 | 12/2015 | Takeda et al. | |
| 9,715,367 B2 | 7/2017 | Sheen | |
| 9,728,180 B2 | 8/2017 | Robertson | |
| 9,803,358 B2 | 10/2017 | Edmonds et al. | |
| 9,952,825 B2 | 4/2018 | Sheen | |
| 9,971,726 B2 | 5/2018 | Vajravel | |
| 10,482,123 B2 | 11/2019 | Woodall et al. | |
| 2005/0216443 A1 | 9/2005 | Morton et al. | |
| 2010/0162117 A1 | 6/2010 | Basso et al. | |
| 2011/0173541 A1 | 7/2011 | Carlson | |
| 2012/0093320 A1 | 4/2012 | Flaks et al. | |
| 2013/0173034 A1 | 7/2013 | Reimann | |
| 2013/0179535 A1 | 7/2013 | Baalu et al. | |
| 2013/0226737 A1 | 8/2013 | Milostic | |
| 2014/0156032 A1* | 6/2014 | Jenkins | G06F 16/632 700/78 |
| 2015/0161695 A1 | 6/2015 | Koby et al. | |
| 2015/0176270 A1* | 6/2015 | Cheung | E04F 15/225 524/8 |
| 2016/0150333 A1* | 5/2016 | Goldstein | G06F 16/686 381/56 |
| 2017/0230764 A1* | 8/2017 | Simonides | H04R 25/70 |
| 2018/0376268 A1 | 12/2018 | Kerdranvat et al. | |
| 2019/0073370 A1 | 3/2019 | Woodall et al. | |
| 2019/0318525 A1 | 10/2019 | Schofield et al. | |

OTHER PUBLICATIONS

U.S. Appl. No. 16/122,537 (U.S. Pat. No. 10,482,123), filed Sep. 5, 2018 (Nov. 19, 2019), Joseph M. Woodall (Columbia Ins. Co.).
U.S. Appl. No. 16/599,974, filed Oct. 11, 2019, Joseph M. Woodall (Columbia Ins. Co.).
U.S. Appl. No. 62/687,644, filed Jun. 20, 2018, Joseph M. Woodall (Columbia Ins. Co.).
U.S. Appl. No. 16/447,387 (U.S. Pat. No. 10,880,663), filed Jun. 20, 2019 (Dec. 29, 2020), Joseph M. Woodall (Columbia Ins. Co.).
PCT/US2018/049573 (WO 2019/050965—, Sep. 5, 2018 (Mar. 14, 2019), Shaw Industries Group, Inc.
Armstrong, "Reverberation Time Calculation" [retrieved from: https:www.armstrongceilings.com/reverb/step.jsp] [Retrieved on: Oct. 9, 2018] (1 page).
Lowe's FloorComfort LVT [Retrieved from: https://www.voutube.com/watch?v=DxNs377ymig][Retrieved on: Oct. 9, 2018] (1 page).
InterfaceFlor, "Just the Facts" Acoustics Brochure 2011 [https:www.interfaceflor.eu] (17 pages).
International Search Report and Written Opinion dated Dec. 17, 2018 by the International Searching Authority for International Application No. PCT/US2018/049573, filed on Sep. 5, 2018 and published as WO/2019/050965 on Mar. 14, 2019 (Applicant—Shaw Industries Group, Inc.) (9 Pages).
Non Final Rejection dated Nov. 19, 2018 by the USPTO for U.S. Appl. No. 16/122,537, filed Sep. 5, 2018 and published as US 2019/0073370 A1 on Mar. 7, 2019 (Inventor—Joseph M. Woodall) (12 Pages).
Response to Non Final Rejection filed on Feb. 12, 2019 to the USPTO for U.S. Appl. No. 16/122,537, filed Sep. 5, 2018 and published as US 2019/0073370 A1 on Mar. 7, 2019 (Inventor—Joseph M. Woodall) (11 Pages).
Final Rejection dated May 6, 2019 by the USPTO for U.S. Appl. No. 16/122,537, filed Sep. 5, 2018 and published as US 2019/0073370 A1 on Mar. 7, 2019 (Inventor—Joseph M. Woodall) (10 Pages).
Response to Final Rejection filed on Jul. 8, 2019 to the USPTO for U.S. Appl. No. 16/122,537, filed Sep. 5, 2018 and published as US 2019/0073370 A1 on Mar. 7, 2019 (Inventor—Joseph M. Woodall) (13 Pages).
Advisory Action dated Aug. 7, 2019 to the USPTO for U.S. Appl. No. 16/122,537, filed Sep. 5, 2018 and published as US 2019/0073370 A1 on Mar. 7, 2019 (Inventor—Joseph M. Woodall) (3 Pages).
Response to Final with RCE filed on Sep. 9, 2019 to the USPTO for U.S. Appl. No. 16/122,537, filed Sep. 5, 2018 and published as US 2019/0073370 A1 on Mar. 7, 2019 (Inventor—Joseph M. Woodall) (5 Pages).
Notice of Allowance dated Oct. 8, 2019 to the USPTO for U.S. Appl. No. 16/122,537, filed Sep. 5, 2018 and published as US 2019/0073370 A1 on Mar. 7, 2019 (Inventor—Joseph M. Woodall) (11 Pages).
Written Opinion issued by the IP Office of Singapore dated Oct. 14, 2021 for Application No. 11202001973Q (8 pages).
Search Report issued by the IP Office of Singapore dated Oct. 11, 2021 for Application No. 11202001973Q (4 pages).
Non-Final Office Action mailed by the USPTO dated Jan. 31, 2022, for U.S. Appl. No. 16/599,974 (12 pages).
European Search Report issued by the EP Patent Office dated Jun. 30, 2021 (Application No. 18853229.5) (Applicant—Shaw Ind. Grp., Inc.) (10 pages).
Australian Examination Report issued from the Australian Patent Office for Australian Patent Application No. 2018328202 dated Dec. 9, 2022 (Applicant ).
Chinese First Office Action issued by the Chinese Patent Office on Jan. 4, 2023 for CN Application 201880065405X filed (Applicant Shaw Ind. Grp., Inc.) (19133.0286CN1)(7 pages). (English Translation).
Non-Final Rejection dated Jan. 31, 2022 by the USPTO for U.S. Appl. No. 16/599,974, filed Oct. 11, 2019 and granted as U.S. Pat. No. 11,461,387 on Oct. 4, 2022 (Inventor—Joseph M. Woodall) (13 pages).
Response to Non Final Office Action filed on Apr. 21, 2022 for U.S. Appl. No. 16/599,974, filed Oct. 11, 2019 and granted as U.S. Pat. No. 11,461,387 on Oct. 4, 2022 (Inventor—Joseph M. Woodall) (12 pages).
Notice of Allowance dated May 27, 2022 by the USPTO for U.S. Appl. No. 16/599,974, filed Oct. 11, 2019 and granted as U.S. Pat. No. 11,461,387 on Oct. 4, 2022 (Inventor—Joseph M. Woodall) (11 pages).
Non Final Rejection dated May 12, 2020 for U.S. Appl. No. 16/447,387, filed Jun. 20, 2019 and granted U.S. Appl. No. 10/880,663, filed Dec. 29, 2020 (Inventor—Joseph M. Woodall) (12 pages).
Response to Non Final Rejection filed Aug. 11, 2020 for U.S. Appl. No. 16/447,387, filed Jun. 20, 2019 and granted as U.S. Appl. No. 10/880,663, filed Dec. 29, 2020 (Inventor—Joseph M. Woodall) ( 12 pages).
Notice of Allowance dated Aug. 26, 2020 by the USPTO for U.S. Appl. No. 16/447,387, filed Jun. 20, 2019 and granted as U.S. Appl. No. 10/880,663, filed Dec. 29, 2020 (Inventor—Joseph M. Woodall) (8 pages).
Chinese Second Office Action dated Jul. 20, 2023 issued in related application No. CN201880065405X.

* cited by examiner

┌─────────────────────────────────────────────┐
│ DETERMINE A PLURALITY OF AUDIO PARAMETERS   │ — 402
└─────────────────────────────────────────────┘
                      ↓
┌─────────────────────────────────────────────┐
│ DETERMINE A VALUE FOR EACH OF               │ — 404
│ THE PLURALITY OF AUDIO PARAMETERS           │
└─────────────────────────────────────────────┘
                      ↓
┌─────────────────────────────────────────────┐
│ CONFIGURE AN ELECTRONIC DEVICE              │ — 406
│ TO CAPTURE AUDIO                            │
└─────────────────────────────────────────────┘
                      ↓
┌─────────────────────────────────────────────┐
│ PERFORM AN ACOUSTIC TEST                    │ — 408
└─────────────────────────────────────────────┘
                      ↓
┌─────────────────────────────────────────────┐
│ CAPTURE AUDIO ASSOCIATED WITH THE ACOUSTIC TEST │ — 410
└─────────────────────────────────────────────┘
                      ↓
┌─────────────────────────────────────────────┐
│ STORE THE CAPTURED AUDIO AS A SOUND FILE    │ — 412
└─────────────────────────────────────────────┘
                      ↓
┌─────────────────────────────────────────────┐
│ RECEIVE A RESULT OF THE ACOUSTIC TEST       │ — 414
└─────────────────────────────────────────────┘
                      ↓
┌─────────────────────────────────────────────┐
│ MAP THE RESULT TO THE STORED SOUND FILE     │ — 416
└─────────────────────────────────────────────┘

FIG. 6

METHODS AND SYSTEMS FOR SOUND FILE CREATION

CROSS REFERENCE TO RELATED APPLICATIONS

This application is a continuation of U.S. Non-Provisional Application Ser. No. 16/447,387, filed on Jun. 20, 2019, which claims priority to U.S. Provisional Application No. 62/687,644, filed on Jun. 20, 2018, each of which are incorporated by reference in their entireties herein.

BACKGROUND

Noise is typically defined as unwanted sound. High noise levels worsen patient and staff outcomes in hospitals, hinder teaching and learning in schools, negatively impact productivity in offices, and disrupt living environments in homes, apartments, and condominiums. With flooring, one of the most abundant finishes in the built environment, the opportunity to positively influence the acoustical performance of a space is great. Different commercial floor coverings such as ceramic, wood, resilient/vinyl, carpet and textile composite flooring control sound differently. Harder materials such as ceramic, wood, and resilient/vinyl absorb little or no sound and have greater potential to transmit sound, contributing to a noisier environment. Softer materials such as carpet and textile composite flooring absorb significantly more sound and transmit less sound, contributing to a quieter environment.

Acoustic tests exist that can measure the acoustic properties of interior surfaces and finishes. Such acoustic tests involve measuring the noise levels produced during the various test procedures, but the results are typically reported only numerically. This is suitable for experts but is difficult for laypeople to interpret. While audio recordings of the testing procedure are sometimes performed, existing methods and systems for recording and creating the sound files are often subpar, which leads to an imperfect reproduction of the results. Consequently, it can be difficult to communicate the results of acoustical testing to homeowners, developers, purchasers, contractors, manufacturers, and other stakeholders, and a goal of the acoustic tests—to assist in building design and construction—is not met. These and other shortcomings are addressed by the present disclosure.

BRIEF SUMMARY

It is to be understood that both the following general description and the following detailed description are exemplary and explanatory only and are not restrictive. In an aspect, disclosed are methods for, among other things, performing a series of acoustic tests in a variety of testing environments comprising several types of construction assemblies. Prior to performing each acoustic test, a plurality of audio parameters corresponding to a given construction assembly can be used to configure an electronic device that captures audio produced by the acoustic test with a microphone and stores the captured audio as a computer sound file. Further, an acoustic testing device can be used during the acoustic test to gather data indicative of a result of the acoustic test. The result can then be mapped, along with information related to the given construction assembly, to the computer sound file.

In another aspect, disclosed are systems comprising an impact source, an acoustic testing device, and an electronic device. The impact source can be configured to generate noise associated with a given construction assembly of a testing environment. The acoustic testing device can comprise an audio sensor, which can be used to determine values of one or more audio parameters associated with acoustic properties of the generated noise, and a transmitter, which can transmit the determined values to an electronic device. The electronic device can be, among other things, a computing device such as a laptop, desktop, or the like, comprising a microphone, a memory, and a receiver. The electronic device, with the receiver, can receive the determined values from the acoustic testing device. The microphone of the electronic device can be used to capture audio associated with the generated noise, which can be stored in the memory as a sound file. Further, the electronic device, with the receiver, can receive the values of the one or more audio parameters from the acoustic testing device as a packaged result, and the result can then be mapped, along with information related to the given construction assembly, to the sound file.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and system.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As will be described in greater detail herein, systems and methods provided can be used to generate noise in a testing environment comprising a given construction assembly and to capture associated audio during an acoustic test. In addition to the audio, a plurality of audio parameters that correspond to acoustic properties of the generated noise can be determined. The captured audio can then be stored as a computer sound file, and the plurality of audio parameters as well as information corresponding to the given construction assembly and the acoustic properties of the generated noise can be mapped to the sound file. Both the audio and the plurality of audio parameters can differ between acoustic tests performed in various testing environments comprising different construction assemblies, and each test can be stored as a separate sound file in a searchable library. These sound files can be used to compare acoustic performance of one or more products (e.g., construction assemblies such as flooring materials), which can assist in building design and construction.

In an aspect, the plurality of audio parameters for a given sound file can be adjusted or edited. For example, a computer interface can be used to visually depict the plurality of audio parameters, such as a length, a frequency range, a signal-to-noise ratio, an artifact level, or a gain level—any of which can be edited using the interface. Additionally, the interface can be used to append metadata to the given sound file. Appending metadata can include appending one or more of the mapped acoustic properties of the generated noise, the information related to the given construction assembly, or a description of the testing environment to the sound file.

One of the defining characteristics of sound is the frequency. The typical frequency range for normal human hearing is from about 20 Hz to over 10,000 Hz, with the upper frequency limit varying with age. The human voice falls within the low-frequency end of the spectrum, at around 100-3,500 Hz. Building noises, such as those emanating from elevators, HVAC systems, and electrical systems, typically range from about 60 Hz to a few thousand Hz. Measurements of sound isolation between spaces in a multifamily residential or mixed-use building are usually performed between 50 and 5000 Hz, although the exact range depends on the specific measurement.

Sound absorption refers to a surface's ability to absorb any incident sound. If a room has surfaces with higher sound absorption, all else being equal, it will be less reverberant and will have lower ambient noise levels. Sound absorption tests, such as ASTM C423-02a, measure how much sound energy is absorbed by a surface. In the test, a floor covering sample is installed in a reverberation room, and the amount of sound energy that is absorbed is compared to the amount of absorption without the sample. The test measures the product's absorption of sound in frequency bands from 100 Hz to 5,000 Hz. All of these frequencies fall within the range of what a normal human ear can hear. A floor covering's effectiveness in absorbing sound is summarized as the Noise Reduction Coefficient (NRC). The greater the absorption, the higher the NRC number. The NRC can be thought of as the percentage of sound absorbed by a surface, although NRC ratings in excess of 1.0 are possible. Hard surfaces such as rubber and vinyl typically have NRCs of about 0.0-0.15, meaning they absorb little to no airborne sound. Commercial carpets used in hospitals, schools and offices have NRCs typically ranging between 0.15 and 0.2. A textile composite flooring's NRC is about 0.30.

Impact insulation refers to a surface's ability to absorb impact noises, such as footsteps and objects dropping on the floor, reducing the sound transmitted into an adjacent space. The impact insulation test most used for flooring, ASTM E492-09, uses a tapping machine in which five hammers strike the floor 10 times per second. Sound pressure in 16 frequency bands is measured in a reverberation room below the floor being tested. The measure is expressed as a whole number, Impact Insulation Class (IIC) (derived from ASTM E989, incorporated herein by reference). The higher the numerical rating, the greater the sound insulation. Impact insulation is merely an example of a test that can be applied to the disclosed methods and systems.

While the acoustic tests described below are primarily with regard to impact insulation, it is understood that the methods and systems described herein can be applied to airborne noise reduction, sound power level, sound absorption, and the like. Acoustic tests and ratings that are contemplated include, but are not limited to, Impact Insulation Class (IIC) (ASTM E492-09, ASTM E989-06) Delta-IIC (ASTM E2179-03), weighted impact sound level L. (ISO 10140-3, ISO 717-2); Impact Sound Rating (ISR), Normalized Impact Sound Rating (NISR) and Apparent Impact Sound Rating (AIIC) (ASTM E 1007, E 989); weighted normalized impact sound level ($L'_{n,w}$) and weighted standardized impact sound level ($L'_{nT,w}$) (ISO 717-2, ISO 16283-2); Sound Transmission Class (STC) (ASTM E 90, E 492); Noise Isolation Class (NIC), Normalized Noise Isolation Class (NNIC), and Apparent Sound Transmission Class (ASTC) (ASTC E 336, E 492); Sound Reduction Index (R), Apparent sound reduction index (R'), Normalized level difference ($D_n$), and Standardized level difference ($D_{nT}$) (ISO 717-1, 10140, 16283-1); Sound Absorption Average (SAA) and Noise Reduction Coefficient (NRC) (ASTM C423-17), weighted sound absorption coefficient ($\alpha_w$) (ISO 354, ISO 11654); and/or Sound Power Level Tests including ANSI S12.51/ISO 3741 and ANSI S12.55/ISO 3745).

Figure 1A:
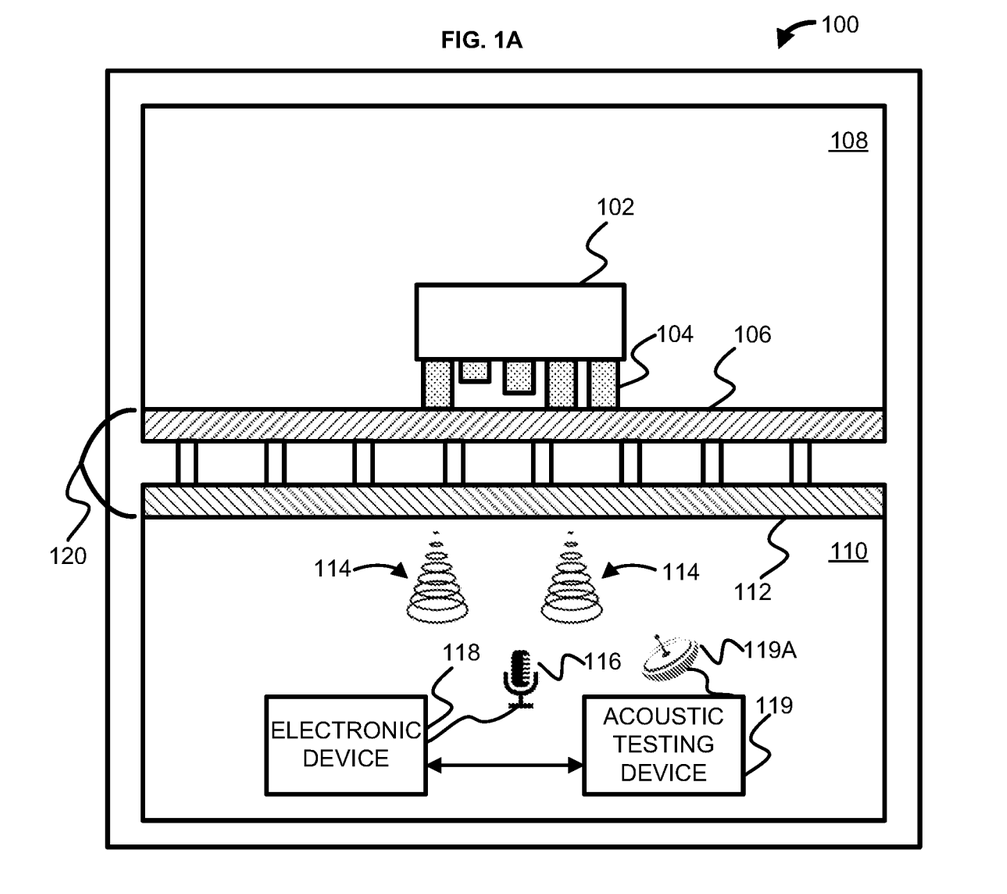
FIG. 1A illustrates an example system for generating media files.
Figure 1B:
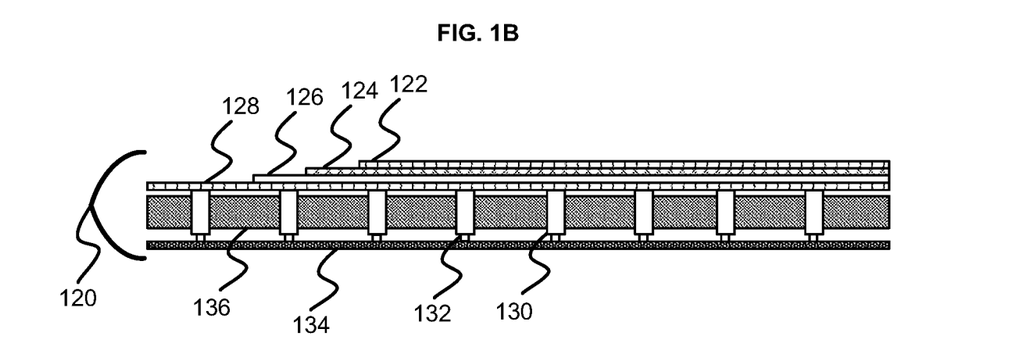
FIG. 1B illustrates an example construction assembly.

FIG. 1A illustrates a system 100 configured for an impact insulation test. The impact source 102 is a standard tapping machine which generates impacts by dropping five hammers 104 onto the floor 106 10 times per second. The impact source 102 can be positioned on the floor 106 of a testing environment 108. The testing environment 108 can be a room of a building. The testing environment 108 can be positioned to be above (e.g., on top of) a space 110. A construction assembly 120 can separate the testing environment 108 and the space 110. The construction assembly 120 can comprise one or more materials that separate the testing environment 108 and the space 110. The construction assembly 120 can vary widely amongst structures. FIG. 1B provides an example construction assembly 120. The construction assembly 120 can comprise, for example, a floor covering 122, a padding 124, an underlayment 126, a subfloor 128, a structural member 130, a ceiling support 132, a ceiling 134, an insulation member 136, combinations thereof, and the like. The floor covering 122 can be, for example, a carpet covering, a resilient/vinyl covering, a hardwood covering, an engineered hardwood covering, a tile covering, and the like. The underlayment 126 can comprise, for example, rebond, frothed foam, waffle rubber, urethane foam, bonded urethane, flat rubber, fiber cushion, slab rubber, fiber, cork, and the like. The subfloor 128 can comprise, for example, hardboard, particle board, oriented strand board (OSB), plywood, concrete, and the like. The structural member 130 can comprise, for example, joists, trusses, a concrete slab, and the like. The ceiling support 132 can comprise furring channels. The ceiling 134 can comprise drywall, plaster, tile, and the like. The insulation member 136 can comprise, for example, fiberglass, mineral wool, plastic fibers, natural fibers, foam board, foam, cellulose, and the like. The construction assembly 120 illustrated in FIG. 1B is merely an example construction assembly 120. Many variations exist that vary not only the types of materials used but also which materials are used. For example, some construction assemblies may lack a floor covering and/or a ceiling, or may lack an insulation member, and the like. In an aspect, a construction assembly can comprise solely a structural member, such as a concrete slab.

Returning to FIG. 1A, the floor 106 of the testing environment 108 can comprise any of the floor covering 122, the padding 124, the underlayment 126, the subfloor 128, the insulation member 136, the structural member 130, combinations thereof, and the like. As the hammers 104 of the impact source 102 strike the floor 106 of the testing environment 108, sound travels through the floor 106 of the testing environment 108 and a ceiling 112 of the space 110. The ceiling 112 can comprise the structural member 130, the ceiling support 132, the ceiling 134, the insulation member 136, combinations thereof, and the like. Noise 114 (e.g., created by the impact source 102 striking the floor 106) comprising a plurality of audio parameters, associated with acoustic properties of the noise 114, can be captured in the space 110 using an audio sensor 119A of an acoustic testing device 119. The acoustic testing device 119 can comprise a decibel meter, a frequency spectrum analyzer, a unidirectional microphone, an omnidirectional microphone, or the like. The acoustic testing device 119 can determine one or more values of one or more of the plurality of audio parameters, and, using a transmitter, can transmit to an electronic device 118 the one or more values as a result of the acoustic test. The plurality of audio parameters can include, for example, one or more of a length, a frequency range, a signal-to-noise ratio, an artifact level, or a gain level.

Likewise, the electronic device 118 can use a microphone 116 coupled to the electronic device 118 to capture (e.g., detect and begin recording) noise 114 that results from the hammers 104 of the impact source 102 striking the floor of the testing environment 106, thereby causing sound to travel through the construction assembly 120 and into the space 110. The electronic device 118 can subsequently store, in a memory of the electronic device 118, the captured noise 114 as a sound file. In an aspect, the construction assembly 120 (including for example, the floor 106 of the testing environment 108 and/or the ceiling 112) can be made of many different materials or a same material. A plurality of combinations of materials for the construction assembly 120 can be installed. For each of the plurality of combinations, the microphone 116 can record the resultant noise 114 in a series of acoustic tests for each respective combination. The electronic device 118 can be configured to store the captured noise 114 for each acoustic test as an uncompressed or a compressed (e.g., lossy or lossless) sound file, and each sound file can be stored in the memory as a searchable library. Further, the electronic device 118 can map to each sound file—or more than one sound file—the result of each acoustic test received from the acoustic testing device 119 as well as information related to the respective combinations of materials for each construction assembly 120 tested.

In various embodiments, each sound file can include electronic representations in a multimedia file comprising acoustic properties of each construction assembly 120 tested as well as the captured noise 114 (e.g., audio) for each acoustic test. The format of each sound file (e.g., the multimedia files) can be, for example, in an uncompressed audio format, such as WAV, AIFF, AU or raw header-less PCM. As another example, each sound file can be in a format with lossless compression, such as FLAC, Monkey's Audio (filename extension.ape), WavPack (filename extension.wv), TTA, ATRAC Advanced Lossless, ALAC (filename extension.m4a), MPEG-4 SLS, MPEG-4 ALS, MPEG-4 DST, Windows Media Audio Lossless (WMA Lossless), or Shorten (SHN). In a further example, each sound file can be in a format with lossy compression, such as Opus, MP3, Vorbis, Musepack, AAC, ATRAC or Windows Media Audio Lossy (WMA lossy).

The electronic device 118 can store (e.g., in a database in the memory) the sound files in a searchable library. As discussed above, the result of each acoustic test received from the acoustic testing device 119 as well as information related to the respective combinations of materials for each construction assembly 120 tested can be mapped to each sound file—or more than one sound file. Additionally, the electronic device 118 can further comprise a computing device in communication therewith.

Figure 2:
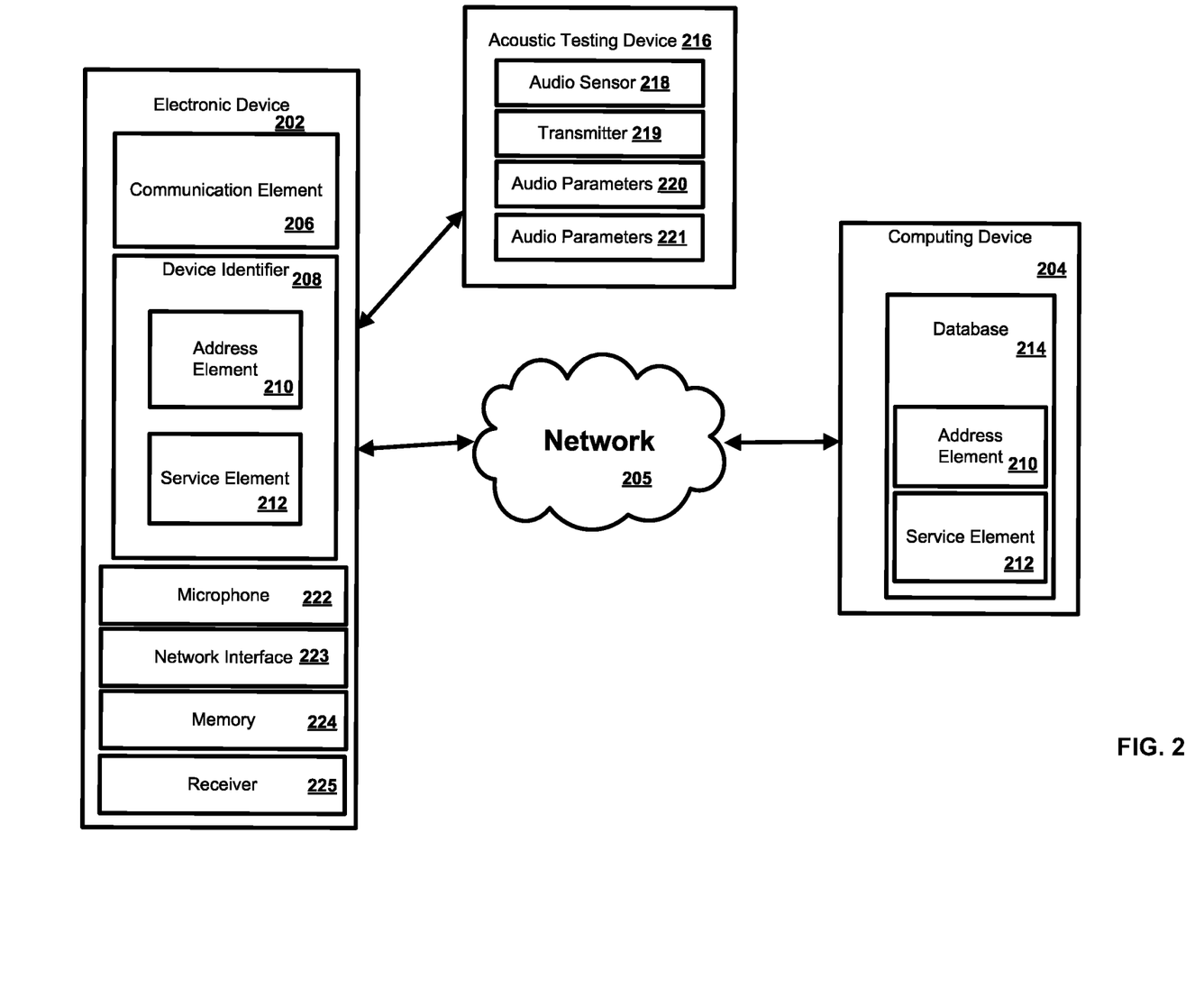
FIG. 2 illustrates a block diagram of an exemplary system and network.

FIG. 2 illustrates block diagrams representative of the electronic device 118 (referred to as electronic device 202), as well as the computing device in communication with the electronic device 118, and the acoustic testing device 119 (referred to as acoustic testing device 216). Electronic device 202 can be a computer, tablet, mobile device, or the like. Those skilled in the art will appreciate that components of system 100 described herein may be used in various types of networks and systems that employ both digital and analog equipment. One skilled in the art will appreciate that provided herein is a functional description and that the respective functions can be performed by software, hardware, or a combination of software and hardware.

The electronic device 202 can be in communication with the computing device 204. The computing device 204 may be disposed locally or remotely relative to the electronic device 202. The electronic device 202 and the computing device 204 can be in communication via a private and/or public network 205 such as the Internet or a local area network. Other forms of communications can be used such as wired and wireless telecommunication channels.

The electronic device 202 may be an electronic device such as a computer, a smartphone, a laptop, a tablet, or other device capable of communicating with the computing device 204. The electronic device 202 can comprise a communication element 206 for providing an interface to a user to interact with the electronic device 202 and/or the computing device 204 (e.g., for editing and/or adjusting one or more of the created sound files). The communication element 206 may be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the electronic device 202 and the computing device 204. The communication element 206 may request or query various files from a local source and/or a remote source (e.g., database 214 of the computing device 204, in which the one or more sound files may be stored). The communication element 206 can transmit data to a local or remote device such as the computing device 204.

The electronic device 202 may be associated with a user identifier or device identifier 208. The device identifier 208 can be any identifier, token, character, string, or the like, for differentiating one user or electronic device 202 (e.g., electronic device 202) from another user or electronic device 202. The device identifier 208 may comprise an address element 210 and a service element 212. The address element 210 may comprise or provide an internet protocol address, a network address, a media access control (MAC) address, an Internet address, or the like. The address element 210 can be relied upon to establish a communication session between the electronic device 202 and the computing device 204 or other devices and/or networks. The address element 210 may be used as an identifier or locator of the electronic device 202. The address element 210 can be persistent for a particular network 205.

The service element 212 may comprise an identification of a service provider associated with the electronic device 202 and/or with the class of the electronic device 202. The class of the electronic device 202 may be related to a type of electronic device (e.g., laptop, desktop, server, mobile device, etc.). The service element 212 can comprise information relating to or provided by a communication service provider that may be providing or enabling data flow such as communication services to the electronic device 202. The address element 210 may be used to identify or retrieve data from the service element 212, or vice versa. One or more of the address element 210 and the service element 212 can be stored remotely from the electronic device 202 and retrieved by one or more devices such as the electronic device 202 and the computing device 204. Other information may be represented by the service element 212.

The electronic device 202 may include one or more network interfaces 223. The network interfaces 223 comprise a transceiver facilitating the connection of the electronic device 202 to the network 205. The network interfaces 223 can include a cellular transceiver facilitating a cellular connection to the network 205. The network interfaces 223 may also include wireless radios facilitating a wireless connection to the network 205. Such wireless radios may include Wi-Fi transceivers, Bluetooth transceivers, infrared transceivers, or other transceivers as can be appreciated. The network interfaces 223 may also include wired network interfaces 223, such as Ethernet interfaces, cable interfaces, or other wired network interfaces 223. The electronic device 202 can comprise multiple network interfaces 223 allowing for the transmission and reception of data across multiple communications channels. The electronic device 202 may transmit data to or receive data from the computing device 204 using any of the multiple network connections available through the network interfaces 223. The electronic device 202 can further include a microphone 222 (e.g., microphone 118) that can be used to detect and record audio (e.g., such as noise 114), which is subsequently stored to a memory 224 (e.g., as a sound file(s)). Additionally, the electronic device 202 can include a receiver 225 that facilitates communication with the computing device 204 via the network 205 or other means.

The computing device 204 may be a server for communicating with the electronic device 202, and/or the acoustic testing device 216. The computing device 204 may communicate with the electronic device 202 for providing data and/or services. The computing device 204 can provide services such as network (e.g., Internet) connectivity, data retrieval and modification (e.g., retrieving one or more sound files from the database 214 and facilitating adjustment or edits made thereto), or other network-related services. The computing device 204 can allow the electronic device 202 to interact with remote resources such as data, devices, and files (e.g., the one or more created sound files).

The computing device 204 can also manage communications between the electronic device 202 and a database 214 for sending and receiving data (e.g., one or more sound files stored in a searchable library) therebetween. The database 214 may store a plurality of files (e.g., sound files associated with one or more acoustic tests performed by system 100) or other information. The electronic device 202 can request and/or retrieve a file from the database 214. The database 214 can store information relating to the electronic device 202 such as the address element 210 and/or the service element 212. The computing device 204 may obtain the device identifier 208 from the electronic device 202 and retrieve information from the database 214 such as the address element 210 and/or the service elements 212. The computing device 204 may obtain the address element 210 from the electronic device 202 and may retrieve the service element 212 from the database 214, or vice versa. Any information can be stored in and retrieved from the database 214. The database 214 may be disposed remotely from the computing device 204 and accessed via direct or indirect connection. The database 214 can be integrated with the computing system 204 or some other device or system.

The acoustic testing device 216 can include an audio sensor 218 (e.g., audio sensor 119A) which can determine one or more values of one or more of a plurality of audio parameters (e.g., audio parameters 220 and/or audio parameters 221) associated with acoustic properties of a sound or a noise (e.g., noise 114) that results from an acoustic test performed. The acoustic testing device 216 can be in communication with a network such as the network 205, and it may transmit, using transmitter 219, the acoustic properties (and values of each) of the sound or the noise (e.g., noise 114) to the electronic device 202 and/or to the network 205 (e.g., as a result of an acoustic test).

The data described above that is received by the computing device 204 may be transmitted by the acoustic testing device 216 and/or the electronic device 202 at a predefined interval. Optionally, or in addition to, the data described above that is received by the computing device 204 may be transmitted after a request from the computing device 204 and/or after receiving a user input.

Figure 3A:
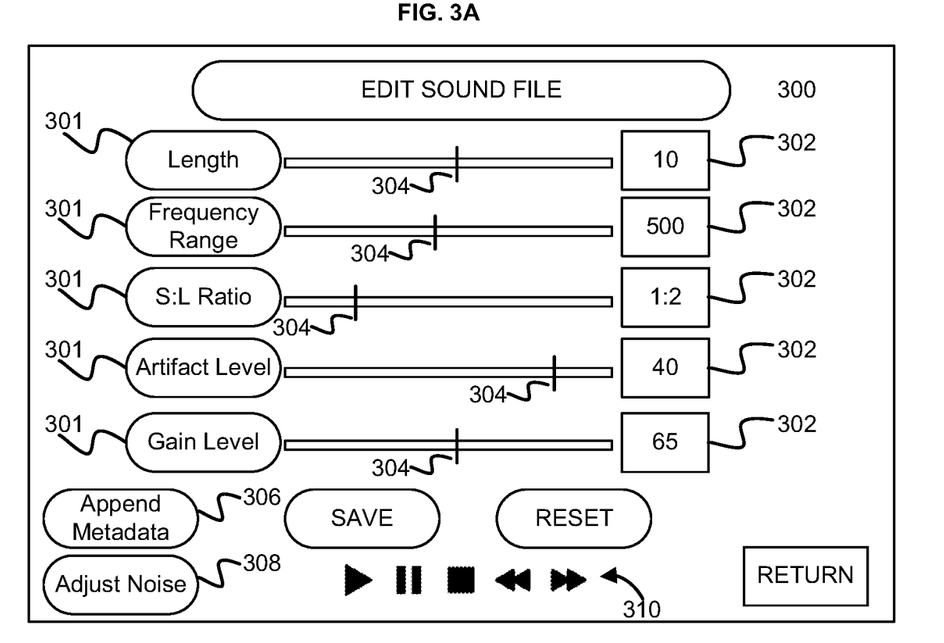
FIGS. 3A-3C illustrate example interfaces.
Figure 3B:
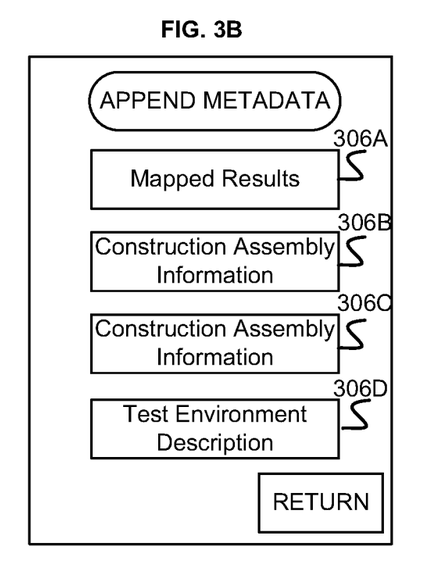
Figure 3C:
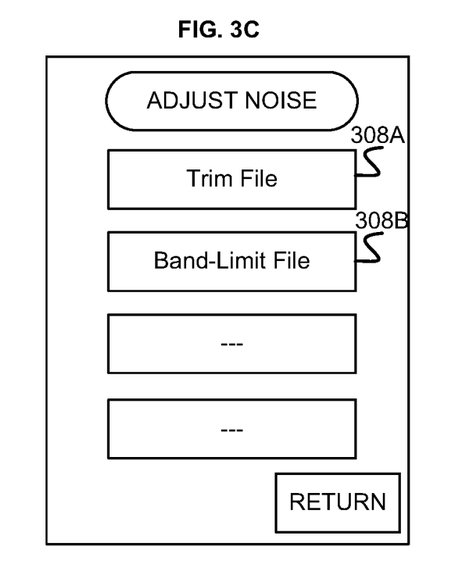

Turning now to FIG. 3A, an exemplary interface 300 (e.g., of the computing device 204, the electronic device 118 and/or the electronic device 202) is illustrated. The interface 300 can be configured for editing/adjusting one or more values 302 of the plurality of audio parameters 301 (e.g., audio parameters 220 and/or audio parameters 221) in the sound files stored in a database (e.g., database 214). Such edits/adjustments can be made to the gain level of each sound file relative to all of the other sound files (e.g., such that the gain level of each sound file is identical to an actual measured noise level (e.g., noise 114) of each acoustic test relative to the other acoustic tests). Further, or optionally, the interface 300 can facilitate appending metadata to one or more of the sound files (e.g., by selecting the "Append Metadata" 306 button). FIG. 3B illustrates an exemplary screen of interface 300 at which one or more of mapped results 306A of acoustic tests, information related to construction assemblies 306B, 306C (e.g., such as a material(s) used to make construction assembly 120), and/or a description of a test environment 306D (e.g., a location, size, etc., of testing environment 108 and/or space 110) can be appended as metadata to each sound file. The interface 300 can further facilitate adjustments of a noise level (e.g., adjusting a noise level in one or more of the sound files to reduce non-acoustic test related noise) in one or more of the sound files (e.g., by selecting the "Adjust Noise" 308 button). FIG. 3C illustrates an exemplary screen of interface 300 at which a sound file can be trimmed 308A (e.g., a length/duration of the audio in the sound file can be reduced) and/or a sound file can be band-limited to a determined frequency range. The interface 300, using control bar 310, can be used to cause a sound file that is currently being edited/adjusted to be played (e.g., through one or more speakers or other audio equipment in communication with, or a part of, the computing device 204, the electronic device 118 and/or the electronic device 202), paused, stopped, tracked forward, and/or tracked backward. In an aspect, after edits/adjustments are made to a given sound file, the "Save" button of interface 300 can be used to cause the edits/adjustments to be saved to memory (e.g., in database 214). Additionally, the "Reset" button of interface 300 can be used to restore one or more edited/adjusted values 302 of the plurality of audio parameters 301 (e.g., revert to a previous, unedited/unadjusted state) for the given sound file.

The interface 300 of the computing device 204, the electronic device 118 and/or the electronic device 202 can be further configured to process one or more sound files identified by a query to search the database (e.g., database 214) containing the one or more sound files. In an aspect, the interface 300 can be used to cause the one or more sound files to stream, download, or otherwise to be rendered by one or more of the computing device 204, the electronic device 118 and/or the electronic device 202. The interface 300 can also be used to cause one or more of the computing device 204, the electronic device 118 and/or the electronic device 202 to transcode the one or more sound files from one format to another, based on playback requirements (e.g., format requirements for given set of audio equipment used to reproduce/play a sound file). In yet another aspect, the interface 300 can be used to facilitate a mixing, overlaying, normalizing, or otherwise processing of the one or more sound files.

Figure 4:
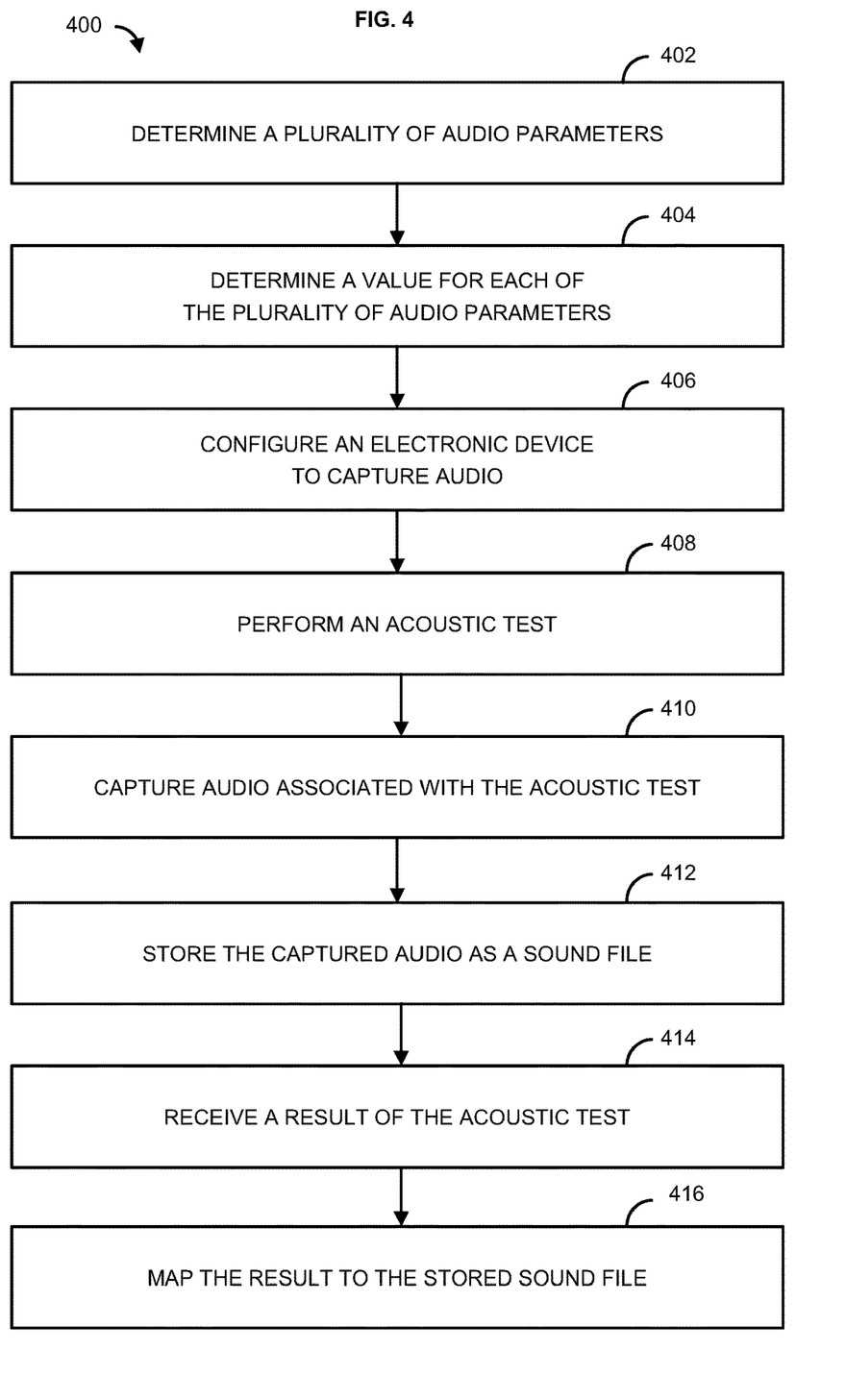
FIG. 4 illustrates an exemplary method.

FIG. 4 is a flowchart depicting a general example of a method 400 for generating a plurality of sound files associated with one or more acoustic tests. In some aspects, the method 400 can be performed using one or more components of system 100. At step 402 a plurality of audio parameters based on an acoustic test to be performed can be determined. In an aspect, the plurality of audio parameters can comprise one or more of a length, a frequency range, a signal-to-noise ratio, an artifact level, or a gain level. The acoustic test can include one or more of a sound transmission test, a sound power test, a sound absorption test, or a sound airborne test, and each acoustic test can provide a representation of acoustics of a testing environment comprising a construction assembly (e.g., material used to build a floor and/or ceiling of the testing environment, such as in testing environment 108 and/or space 110).

At step 404, a value for each of the plurality of audio parameters can be determined, based on the construction assembly (e.g., a type of material or materials used to make, for example, construction assembly 120). At step 406 an electronic device (e.g., electronic device 118 and/or electronic device 202) for capturing audio can be configured (e.g., calibrated) according to the values for the plurality of audio parameters. At step 408 the acoustic test is performed (e.g., using impact source 102 in which the one or more hammers 104 strike the floor 106 a predetermined number of times per second). Audio associated with the acoustic test (e.g., noise 114) can be captured at step 410 with a microphone (e.g., microphone 118) of the electronic device (e.g., electronic device 118 and/or electronic device 202) and stored as a computer sound file (e.g., a digital file).

At step 414 a result of the acoustic test can be packaged by the acoustic testing device (e.g., acoustic testing device 119 and/or acoustic testing device 216) and transmitted to the electronic device according to a communications protocol (e.g., wireless transfer using Wi-Fi). The result can be data indicative of the values for the plurality of audio parameters (e.g., one or more of a length, a frequency range, a signal-to-noise ratio, an artifact level, or a gain level). The acoustic testing device can be one or more of a decibel meter, a frequency spectrum analyzer, a unidirectional microphone, an omnidirectional microphone, or the like. Further, the acoustic testing device can be in communication with the electronic device. Finally, at step 416, the result of the acoustic test and information related to the construction assembly can be mapped to the stored sound file. In an aspect, mapping the result of the acoustic test can comprise taking a recording of a known sound signature (e.g., volume across frequencies) using the acoustic testing device. The noise caused by the acoustic test can be recorded by the electronic device (e.g., via the microphone) and stored as a sound file. Next, a calibration file can be adjusted using the recording of the known sound signature, and all adjustments made can then be saved and applied to the record noise caused by the acoustic test.

Figure 5:
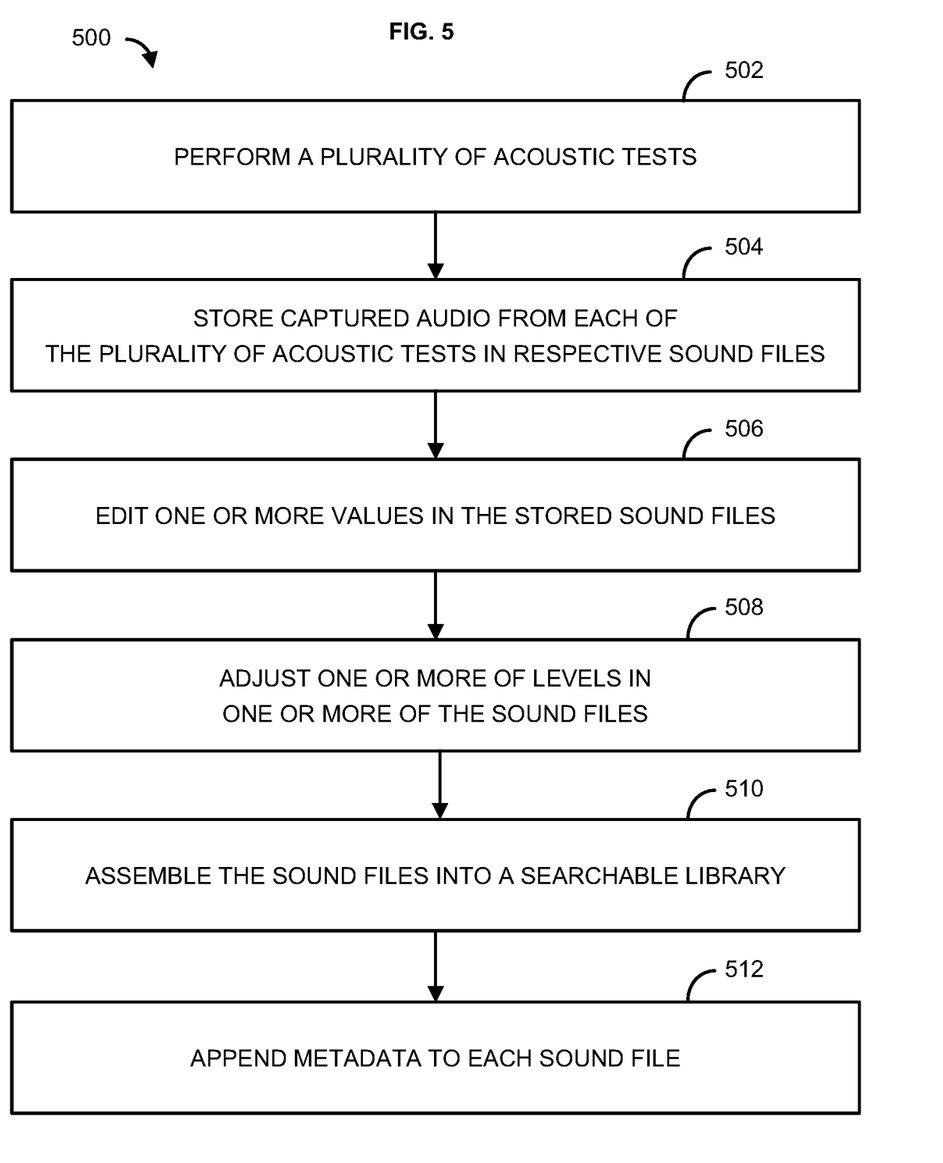
FIG. 5 illustrates an exemplary method.

FIG. 5 is a flowchart depicting a general example method 500, which includes further aspects of method 400. In some aspects, method 500 can be performed using one or more components of system 100. At step 502, a plurality of acoustic tests can be performed for a plurality of construction assemblies (e.g., different materials and/or configurations of material(s)) in a plurality of testing environments (e.g., buildings, houses, etc.). Optionally, or in addition to, at step 504 if more than one acoustic test is performed, the captured audio from each acoustic test can be stored as a separate sound file (e.g., in database 214). Further, at step 506, one or more values of the plurality of parameters in the stored sound files can be edited/adjusted. For example, a gain level in one or more of the stored sound files can be adjusted such that the gain level of each stored sound file relative to all of the other stored sound files is identical to an actual measured noise level of each acoustic test relative to the other acoustic tests. As another example, a noise level in one or more of the stored sound files can be adjusted to reduce non-acoustic test related noise. Adjusting the noise level may be accomplished, for example, by trimming a sound file to a determined length; band-limiting the sound file to a determined frequency range; a combination thereof; and/or the like. At step 508 adjustments/edits can be made to the gain level of one or more of the sound files such that the gain level of each sound file relative to all of the other sound files is identical to an actual measured noise level of each acoustic test relative to the other acoustic tests. Additionally, adjustments/edits can be made to a noise level associated with one or more of the sound files. Adjusting/editing the noise level can lead to a reduction of non-acoustic test related noise in a given sound file (e.g., white noise from a nearby television, noise emanating from an adjacent room or space, or the like). Moreover, adjusting/editing the noise level can include trimming a sound file to a determined length/duration and/or band-limiting a sound file to a determined frequency range.

At step 510 the sound files and the mapped results of the acoustic tests and the information related to the construction assemblies can be assembled into a searchable library (e.g., stored in database 214). Finally, at step 512, metadata can be appended to each sound file. For example, one or more of the mapped results of the acoustic test(s), information related to the construction assembly (or assemblies) used, and/or a description of a test environment can be appended as metadata to each sound file.

Figure 6:
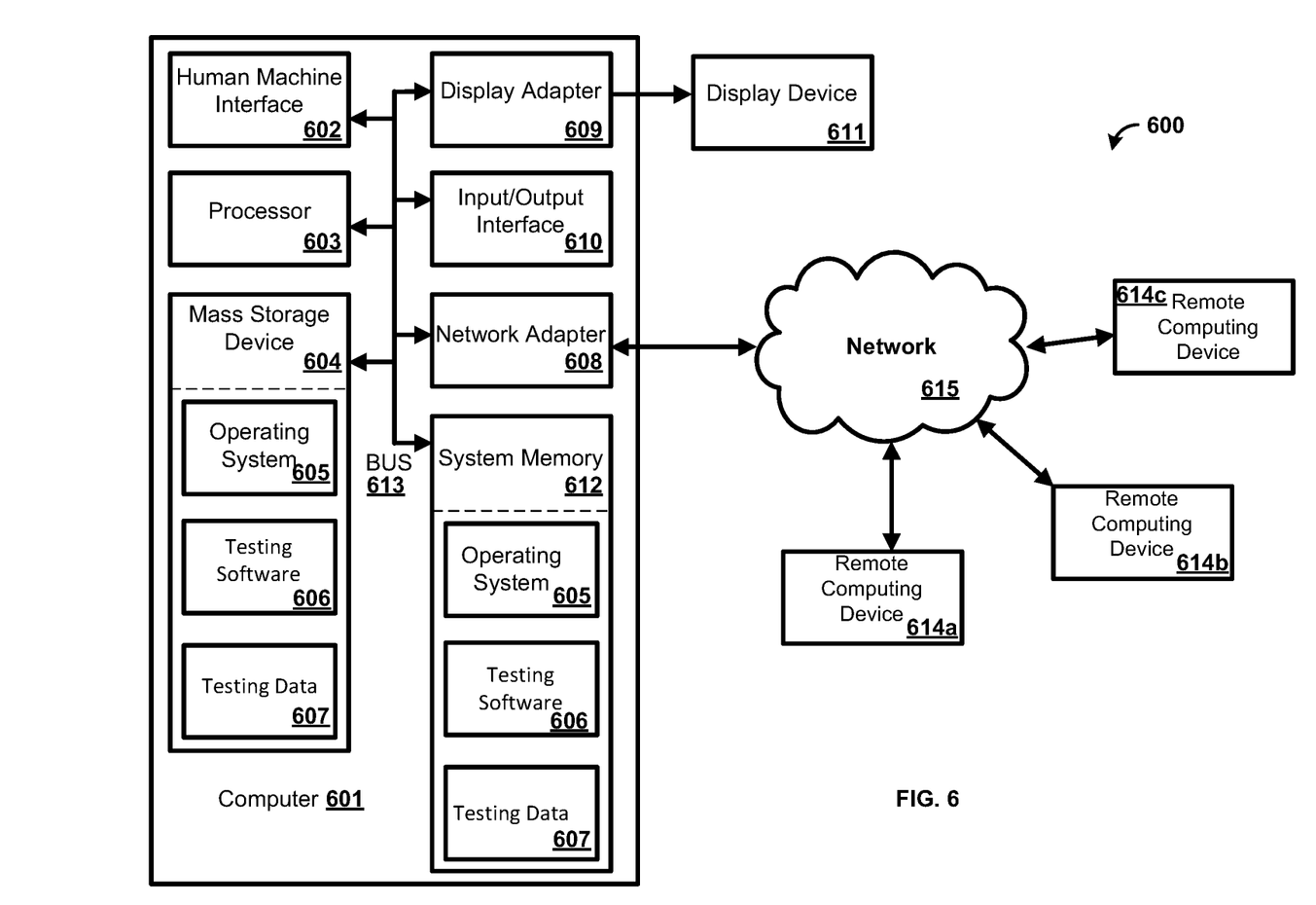
FIG. 6 is a block diagram of an exemplary computing device.

In an exemplary aspect, the methods and systems can be implemented on a computer 601 as illustrated in FIG. 6 and described below. By way of example, the electronic device 118, the acoustic testing device 119, the electronic device 202, the acoustic testing device 216, and/or the computing device 204 can be a computer 601 as illustrated in FIG. 6. Similarly, the methods and systems disclosed can utilize one or more computers 601 to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise programmable consumer electronics, network PCs, minicomputers, mainframe computers, distributed computing environments that comprise any of the above systems or devices, and the like.

The performance of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601 (e.g., the electronic device 118, the acoustic testing device 119, the electronic device 202, the acoustic testing device 216, and/or the computing device 204). The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 613, and all buses specified in this description can also be implemented over a wired or wireless network connection and each of the subsystems, including the one or more processors 603, a mass storage device 604, an operating system 605, testing software 606, testing data 607 a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the testing software 606 and/or program modules such as the operating system 605 and the testing software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the testing software 606. Each of the operating system 605 and the testing software 606 (or some combination thereof) can comprise elements of the programming and the testing software 606. The testing software 606 can also be stored on the mass storage device 604. The testing software 606 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the testing software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a computing device, audio associated with a plurality of acoustic tests performed in a testing environment, wherein each acoustic test of the plurality of acoustic tests comprises noise generated by an impact source acting upon at least one construction assembly of a plurality of construction assemblies in the testing environment,
wherein the computing device is configured to receive the audio according to a plurality of audio parameters, and
wherein the plurality of audio parameters are associated with the plurality of acoustic tests and the plurality of construction assemblies;
storing the audio associated with the plurality of acoustic tests in respective sound files;
mapping, to the respective sound files, for each of the plurality of acoustic tests:
a value of each respective audio parameter of the plurality of audio parameters associated with the respective sound files, wherein the plurality of audio parameters comprises a gain level; and
adjusting, for each of the respective sound files, the value of the gain level based on an actual measured noise level associated with the impact source and the corresponding acoustic test of the plurality of acoustic tests.

2. The method of claim 1, further comprising performing the plurality of acoustic tests.

3. The method of claim 1, further comprising mapping, to the respective sound files, for each of the plurality of acoustic tests, information related to a respective construction assembly of the plurality of construction assemblies.

4. The method of claim 1, wherein the adjusted value of the gain level, for each of the respective sound files, is identical to the actual measured noise level associated with the impact source and the corresponding acoustic test.

5. The method of claim 1, wherein the plurality of audio parameters comprises non-acoustic test related noise.

6. The method of claim 1, further comprising trimming each of the respective sound files to a determined length.

7. The method of claim 1, further comprising band-limiting each of the respective sound files to a determined frequency range.

8. The method of claim 1, further comprising mapping, to the respective sound files, a description of the respective construction assembly of the plurality of construction assemblies.

9. A method comprising:
receiving, by a computing device, captured audio from a respective acoustic test of a plurality of acoustic tests performed in a testing environment, wherein each acoustic test of the plurality of acoustic tests comprises noise generated by an impact source acting upon at least one construction assembly of a plurality of construction assemblies in the testing environment;
storing, in each of a plurality of sound files, the captured audio, comprising the noise generated by the impact source, from the respective acoustic test of the plurality of acoustic tests, wherein each respective sound file of the plurality of sound files comprises a plurality of audio parameters, and wherein the plurality of audio parameters comprises a gain level;
adjusting a value of the gain level in each respective sound file based on the noise generated by the impact source from the respective acoustic test; and
appending metadata to each respective sound file of the plurality of sound files.

10. The method of claim 9, further comprising:
performing the plurality of acoustic tests for the plurality of construction assemblies, wherein each acoustic test of the plurality of acoustic tests is performed in the testing environment comprising a respective construction assembly of the plurality of construction assemblies.

11. The method of claim 10, wherein appending the metadata to each respective sound file of the plurality of sound files comprises appending a description of the respective construction assembly of the plurality of construction assemblies.

12. The method of claim 9, wherein the adjusted value of the gain level for each of the respective sound files is based on at least one audio parameter of the plurality of audio parameters associated with each respective acoustic test of the plurality of acoustic tests.

13. The method of claim 12, wherein the at least one audio parameter comprises a signal-to-noise ratio or a frequency range.

14. The method of claim 12, wherein the at least one audio parameter comprises non-acoustic test related noise.

15. An apparatus comprising:
one or more processors; and
memory storing processor-executable instructions that, when executed by the one or more processors, cause the apparatus to:
receive captured audio from a respective acoustic test of a plurality of acoustic tests performed in a testing environment, wherein each acoustic test of the plurality of acoustic tests comprises noise generated by an impact source acting upon at least one construction assembly of a plurality of construction assemblies in the testing environment;
store, in each of a plurality of sound files, the captured audio, comprising the noise generated by the impact source, from the respective acoustic test of the plurality of acoustic tests, wherein each respective sound file of the plurality of sound files comprises a plurality of audio parameters, and wherein the plurality of audio parameters comprises a gain level;
adjust a value of the gain level in each respective sound file based on the noise generated by the impact source from the respective acoustic test; and
append metadata to each respective sound file of the plurality of sound files.

16. The apparatus of claim 15, wherein the processor-executable instructions further cause the apparatus to:
perform the plurality of acoustic tests for the plurality of construction assemblies, wherein each acoustic test of the plurality of acoustic tests is performed in the testing environment comprising a respective construction assembly of the plurality of construction assemblies.

17. The apparatus of claim 16, wherein the processor-executable instructions that cause the apparatus the apparatus to append the metadata to each respective sound file of the plurality of sound files further cause the apparatus to append a description of the respective construction assembly of the plurality of construction assemblies.

18. The apparatus of claim 15, wherein the adjusted value of the gain level for each of the respective sound files is based on at least one audio parameter of the plurality of audio parameters associated with each respective acoustic test of the plurality of acoustic tests.

19. The apparatus of claim 18, wherein the at least one audio parameter comprises a signal-to-noise ratio or a frequency range.

20. The apparatus of claim 18, wherein the at least one audio parameter comprises non-acoustic test related noise.

\* \* \* \* \*